July 17, 1956 H. D. SMITH 2,755,099

PNEUMATIC SPRING SUSPENSION FOR VEHICLES

Filed Aug. 12, 1953

INVENTOR.
HERSCHEL D. SMITH
BY Lindley E. Mills

United States Patent Office 2,755,099
Patented July 17, 1956

2,755,099

PNEUMATIC SPRING SUSPENSION FOR VEHICLES

Herschel D. Smith, Buffalo, N. Y., assignor to
Sam Beck, Kalamazoo, Mich.

Application August 12, 1953, Serial No. 373,775

1 Claim. (Cl. 280—124)

This invention relates to a suspension for vehicles, particularly to a suspension wherein road shock is absorbed by a pneumatic unit rather than by a conventional metal spring.

The advantages of a pneumatic suspension for a vehicle in promoting better riding qualities and in reducing shock and vibration on the body and working parts of the vehicle are apparent. Many attempts have been made to utilize this principal, but few of the mechanisms devised have met with commercial success for one reason or another. Generally speaking, they have been too complicated and bulky to fit into the space available in conventionally designed vehicles. The number of mechanical parts and of pneumatic units required have been excessive. Most heretofore devised pneumatic suspensions have entailed added expense in the construction of the vehicle and, in many instances, actual re-design of many of the parts of the vehicle.

It is therefore, an object of the present invention to provide an improved pneumatic suspension for a wheeled vehicle.

An additional object is to provide a pneumatic suspension for a wheeled vehicle free from the objections of heretofore devised systems.

An adidtional object is to provide a pneumatic suspension for a vehicle having fewer parts than heretofore devised systems.

An additional object of the invention is to provide a pneumatic suspension for vehicles which can either be incorporated in the vehicle at the time of its assembly or manufacture without substantial re-design of the principal parts of the vehicle or which can be substituted for conventional springs in an already assembled vehicle.

It is a further object of the invention to provide a pneumatic suspension for a vehicle in a form which is economical to construct and maintain and which, because of the greatly reduced transmission of road shock to the frame-supported parts of the vehicle, imparts to the vehicle the ease in riding qualities and a reduction in damage due to vibration which are to be expected from a consideration of the advantages of this type of suspension.

The above and related objects can be accompilshed, as herein first described, readily with a minimum of cost and with the employment of only one pneumatic unit for each pair of opposed vehicle wheels. The number of parts involved in practicing the invention is reduced to a minimum, the use of complicated mechanisms is avoided and the advantages inherent in a pneumatic suspension are realized to the fullest extent. The invention consists essentially in the location of a pneumatic unit in a position intermediate each pair of opposed wheels of the vehicle and in transmitting the shock received by each of the pair of wheels laterally, with respect to the direction of travel of the vehicle, to the same unit by a simple system of levers. In this way a single unit absorbs the shock from both of the pair of wheels, thus reducing by one half the number of units over that generally employed in the heretofore devised systems for pneumatic suspen-sion, the number of mechanical parts is minimized and superior riding qualities are obtained.

The invention can be understood readily by reference to the accompanying drawing wherein, in the interest of clarity, certain features are shown on a somewhat exaggerated scale and wherein.

Figure 1:
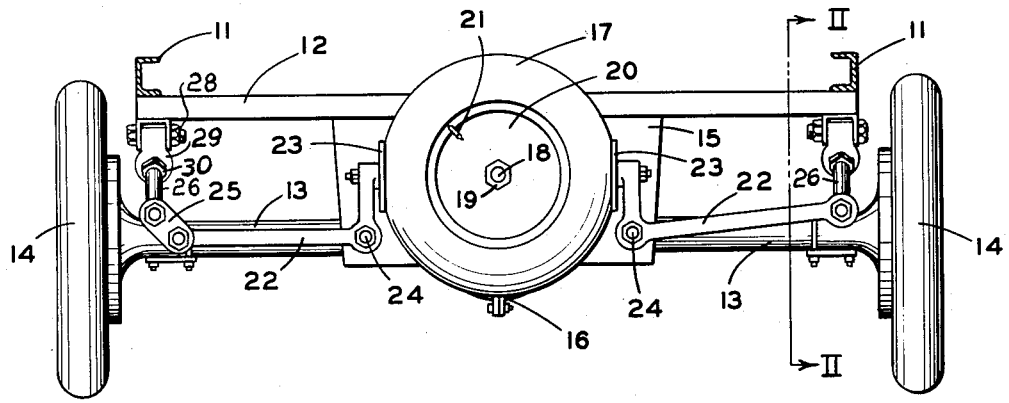
Figure 1 is a rear elevation, with certain parts in section, of a pneumatic suspension of the invention mounted at the rear of a vehicle.

For the sake of simplicity, and to avoid confusion, certain of the parts of the vehicle, e. g. the fenders, the body and the driving mechanism, are not shown in the drawing. These parts are purely conventional and form no part of the invention. The terms "forwardly" and "rearwardly," and their equivalents, as used herein have reference to the normal forward and reverse direction of travel of the vehicle.

Referring to Figure 1, there is shown one modification of the invention as applied to the rear suspension of a conventional four wheeled automobile. In Figure 1, a pair of side rail members of the frame of an automobile are represented in section at 11. A bar 12 of any suitable type extends between and is secured to side rails 11 so that it lies substantially parallel to the rear axle housing 13 of the vehicle, the relative location of a pair of rear wheels being indicated at 14. A plate 15, or other suitable member, is secured, as by welding, to the bar 12 so that it projects downward therefrom a suitable distance. In the modification shown, the bar 12 and plate 15 are located a short distance behind the rear axle housing 13 so that the plate 15 clears the axle housing 13 and the transmission housing 16 as the latter move vertically with respect to the frame members 11. The bar 12 and the plate 15 taken together form a supporting member integral with the frame of the vehicle. It is apparent that the supporting member can be of any suitable design and construction and that it can be located in any suitable position provided only that it allows the mechanism to function properly as hereinafter described. It will also be apparent that in certain instances no supporting member will be needed in addition to conventional frame members when the latter are constructed and located suitably.

A pneumatic unit 17, is mounted on the plate 15 in a position to receive and cushion a thrust in a direction transverse to the direction of travel of the vehicle. The pneumatic unit can be of any suitable construction or shape and can be located in any suitable position provided only that it is adapted to receive and cushion a lateral thrust from either side. In the modification shown, the pneumatic unit 17 consists of a conventional rubber tire and tube mounted on a conventional small wheel 20, such as a hand truck wheel. The wheel 20 is mounted on the plate 15 by a threaded pin 18, secured to the plate and extending through the hub of the wheel, and a nut 19. Suitable bushings, not shown, can be inserted on the bolt 18 between the plate 15 and the hub of the wheel 20 to space the pneumatic unit 17 a short distance from the plate 15 so as not to interfere with the cushioning action of the unit and keep it from rubbing against the plate.

Although in the modification shown the pneumatic unit 17 is mounted in an upright position, it is apparent that it can be mounted in a horizontal position and that it will generally function equally well in either position. The pressure of air in the pneumatic unit can be regulated to a desired value by way of a conventional tire valve 21. In practice, a length of air hose can be secured to the tire valve 21, and brought to some more convenient location where it can be reached easily for adjusting the air pressure in the unit 17.

Figure 4:
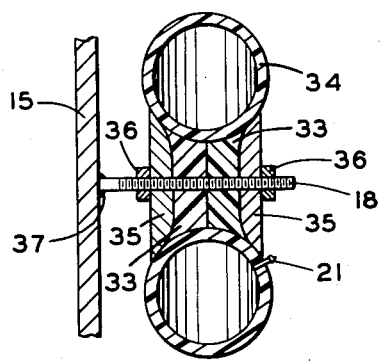
Figure 4 is a sectional elevation of an alternative form of pneumatic unit suitable for use in the pneumatic suspension of the invention.

An alternative form of pneumatic unit, shown in section in Figure 4, comprises an annular air chamber 34 of rubber or other suitable resilient material mounted on a central core formed of two properly contoured core halves 33. The unit and the core are mounted between a pair of plates 35 on a threaded pin 18 and the assembly held rigidly in position by a pair of nuts 36. The pin 18 can be secured, as by welding at its base 37, to a supporting plate 15, the unit thus being mounted in a manner similar to that of the pneumatic unit 17 of Figure 1.

A pair of thrust levers, 22 of Figure 1, are provided, each pivotally mounted on a pivot pin 24 intermediate its ends on the plate 15, one lever being mounted on one side of the pneumatic unit 17 and the other lever being mounted on the other side of the unit. Each of the thrust levers 22 is formed with two arms extending at approximately right angles to one another from the pivot so that as the lever rotates about its pivot 24 one of its ends will move at approximately a right angle with respect to the movement of its other end. One arm of each thrust lever 22, usually the shorter arm, extends to a point adjacent the pneumatic unit 17 and is equipped with a thrust shoe 23 of suitable design, e. g., a flat or curved plate, which bears on the periphery of the pneumatic unit 17. The other arm of each of the thrust levers 22 extends from its respective pivot 24 to a point adjacent the vehicle wheel 14 on the same side of the pneumatic unit 17 as the pivot and is secured pivotally at its outer end with respect to the axle housing 13 in a manner hereinafter described. At least one of the thrust levers is secured at its outer end by way of a shackle 25.

Figure 2:
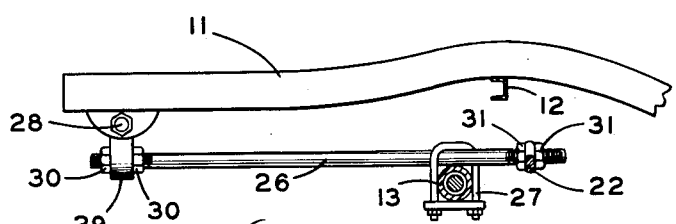
Figure 2 is a side elevation, taken along the line II—II of Figure 1 showing the position assumed by the parts when the vehicle is more heavily loaded than in Figure 1.

Movement of the axle housing 13 forward or backward with respect to the frame 11 of the vehicle, which is ordinarily regulated by the spring in a conventional elliptical spring suspension, is controlled in the present instance by a suitable radius rod, 26 of Figure 2, which is secured to the axle housing 13, as by a tie bolt 27, and which extends forward and is secured on the frame member 11 by hanger 29 and a pivot bolt 28. The radius rod 26 is threaded at its forward end and is secured to the hanger 29 with a pair of nuts 30, the rod 26 being adapted to rotate with respect to the hanger 29 in response to any twisting moment resulting from an unequal approach of the two ends of the axle housing 13 to the frame of the vehicle. The hanger is free to rotate on its pivot 28.

The radius rod 26 extends rearwardly past the axle housing 13 for a distance sufficient to receive the outer end of the thrust lever 22, the lever being pivotally mounted on the extended end of the radius rod 26, e. g. by being retained between a pair of nuts 31 threadably engaging the end of the radius rod 26. The thrust lever 22 is thus free to rotate around the radius rod 26. It is apparent that the length of the extension of the radius rod 26 rearwardly past the axle housing 13 will depend upon the relative location of the pneumatic unit 17 with respect to the housing 13. Inasmuch as the rotation of the thrust lever 22 around the radius rod 26 is in substantially a vertical plane, it is desirable that the extension of the radius rod 26 behind the housing 13 be as nearly horizontal as possible. This can be accomplished by use of a hanger 29 of suitable length, by using a suitably bent radius rod or in any other convenient manner. In certain instances it may be advisable to mount the outer end of the thrust lever 22 on the extension of the radius rod 26 by way of a ball joint to accommodate such twisting moments as may be set up during the operation of the device, as well as to provide for the rotation referred to previously. It is apparent that separate means can be provided, if desired, for securing the rear end of the rod 26 and the outer end of the thrust lever 26 to the axle housing 13.

In operation, the pneumatic suspension just described responds to road shock in the following manner. When one of the wheels 14 rises with respect to the frame member 11, the outer end of the corresponding thrust lever 22 is elevated accordingly. This causes the lever to rotate around its pivot point 24 thus forcing the thrust shoe 23 into greater pressure contact with the pneumatic unit 17. The latter yields accordingly and thus absorbs the shock. When the resistance of the unit 17 has increased sufficiently, due to the compression of the air therein, the upward movement of the wheel and axle housing with respect to frame member 11 is arrested. This occurs gradually rather than suddenly. The resiliency of the air in the pneumatic unit 17 then exerts a counter pressure on the thrust shoe 23 causing the axle housing 13 and wheel 14 to return to their original positions with respect to the frame member 11. It is apparent that the device described has the effect of cushioning the shock from each of the two wheels 14 independently of one another and that the same effect is obtained as would be obtained by individual suspension of each of a pair of wheels even though the two wheels are actually mounted on the same rigid axle. The mechanism shown in Figures 1 and 2 can be modified in numerous ways without departing from the spirit of the invention. Certain of such modifications will be described subsequently.

The pneumatic suspension of the invention is also adapted to installation on a vehicle wherein the wheels are individually mounted, e. g. as in a conventional "knee-action" mounting of front wheels wherein a solid axle connecting the front wheels is not employed. The utilization of the present suspension in one such instance is shown fragmentarily and somewhat schematically in Figure 3 wherein the front spindle assembly 42, on which is mounted a front wheel 14, is supported between two control arms 46 and 47 which are pivotally mounted at 48 and 49, respectively on a frame member 43, all in conventional fashion. The control arms 46 and 47 are each generally in the form of a horizontal V with the open end of the V providing for elongated pivots at 48 and 49. This construction maintains the front wheel properly spaced in a forward or backward direction with respect to the vehicle frame without the use of more conventional radius rods.

Figure 3:
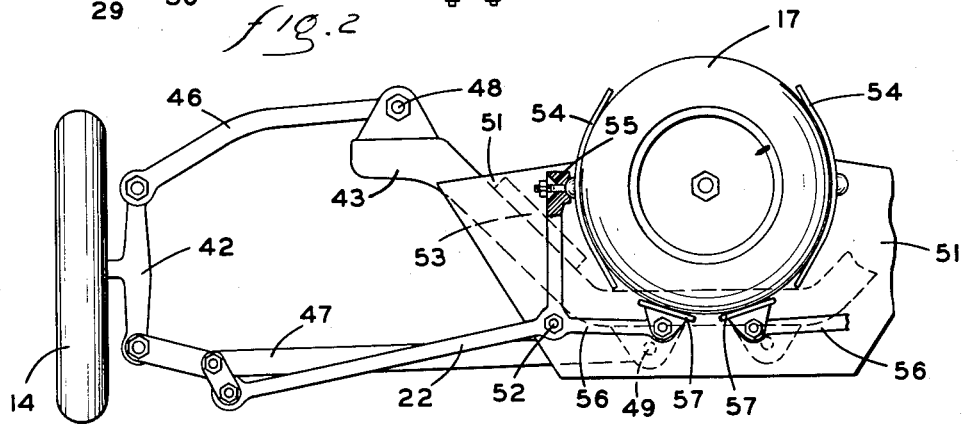
Figure 3 is a front elevation somewhat schematic and partially in section, of a pneumatic suspension of the invention mounted at the front of a vehicle originally constructed for conventional knee-action front suspension.

In Figure 3 a pneumatic unit 17 is shown mounted on a suitable supporting plate 51 secured to a front end member of the vehicle frame in any convenient way, as by way of a bracket 53. Pivot pins 52 are also mounted on the plate 51, the pins each having mounted thereon a thrust lever 22 equipped at one end with a thrust shoe 54 adapted to bear on the periphery of the unit 17. The outer end of each thrust lever 22 is secured to one of the control arms, usually the lower arm 47, at a point adjacent the spindle assembly 42. The connection between each thrust lever 22 and the corresponding wheel-supporting arm 47 is by way of a shackle to allow for a proper rotation of the thrust lever 22 and the control arm 47 around their respective pivots.

It will be observed that the thrust shoe 54 and its manner of mounting on the thrust lever 22, as illustrated in Figure 3, are somewhat different from the thrust shoe 23 and its mounting as illustrated in Figure 1. Whereas the thrust plate 23 of Figure 1 is simply a flat plate and is bolted rigidly to the thrust lever 22, the corresponding member of Figure 3 is a shoe 54 having the same curvature over a considerable proportion of its length as the periphery of the pneumatic unit 17. In this way a larger bearing surface of the shoe on the pneumatic unit is provided which is of advantage in certain instances. Also, the curved shoe 54, or the flat shoe 23, can be secured to the thrust lever 22 by way of a conventional ball joint, shown in section at 55 of Figure 3.

It should be noted that, when using the pneumatic suspension herein described, the use of metal springs, shock absorbers and sway bars can be avoided entirely. The elimination of metal springs is of advantage because it eliminates the danger due to spring breakage. It also avoids the well known tendency of metal springs to oscillate in response to a sudden change in loading. Such oscillation is virtually absent in the pneumatic suspension described herein due to the characteristically different manner of rebound exerted by a leaf or coil metal spring on the one hand and a pneumatic unit on the other hand. Using the pneumatic unit described it is found that when the vehicle passes over a road irregularity at a high rate of speed and the vehicle wheel is thus subjected to a violent shock, the shock energy is absorbed smoothly and evenly by the pneumatic unit and that the rebound is correspondingly smooth and even with practically no tendency for oscillation to occur.

The new pneumatic suspension has numerous advantages over hitherto described pneumatic suspensions. Because only one pneumatic unit is involved in the suspension for each pair of opposite wheels, there is developed an evenness of ride and a lack of side sway on curves virtually impossible to obtain when separate pneumatic units are used for each wheel. Adjustment of air pressure in the single unit to suit the load, rather than attempting to adjust and maintain the pressure equal in two units, insures automatic equalization of resistance to shock on both sides of the vehicle. Although not accomplished satisfactorily, this same effect has been sought, when using separate pneumatic units, by connecting the units with an air tube. This expedient does, however, not accomplish the desired purpose because of the unavoidable lag in pressure adjustment between the two units when using a tube of any practical diameter. Such an arrangement is also cumbersome and costly.

It is, of course, true that with any type of suspension the amount of oscillation following a wheel shock is proportional to the degree of shock imparted to the wheel. For this reason it may, under some circumstances, be advisable to provide a snubbing action even with the herein described pneumatic suspension. This can be accomplished readily as shown in Figure 3 by providing a third or snubber arm 56 on the thrust lever 22 inclined at a suitable angle to the other two arms, and a snubber shoe 57 mounted thereon in such a fashion that, when the pressure of the thrust shoe 54 on the pneumatic unit 17 is decreasing, the pressure of the snubber shoe on the unit is increasing, and vice versa. Such an arrangement also has the advantage of maintaining the frame and under carriage of the vehicle in approximately their normal positions with respect to one another when it becomes necessary to lift a wheel off the ground, as when changing a tire, or when working on the under parts of the vehicle.

I claim:

In a pneumatic suspension for a wheeled vehicle having a frame, the combination including: a pneumatic unit mounted on a member integral with the frame in a position substantially central with respect to a pair of vehicle wheels; a pair of angular thrust levers each mounted on and adapted to rotate in a substantially vertical plane around a pivot pin integral with the frame; an arm of each thrust lever extending from the pivot pin to a point adjacent the pneumatic unit and having secured thereto a thrust shoe adapted to bear on the unit in a direction substantially transverse with respect to the direction of travel of the vehicle, the forces exerted by the two thrust shoes being applied on substantially opposite sides of the pneumatic unit; another arm of each thrust lever extending from the pivot pin to a point adjacent a wheel-mounting member of the vehicle and secured thereto, at least one arm being secured to its respective wheel-mounting member by means including a shackle; and a third arm of each thrust lever extending from the pivot pin to a point adjacent the pneumatic unit and having secured thereto a snubber shoe adapted to bear against the unit to exert thereon a pressure in opposition to the pressure of the thrust shoe secured to the first arm of the same thrust lever whereby excessive rebound following a wheel shock is prevented.

References Cited in the file of this patent

UNITED STATES PATENTS

| | | |
|---|---|---|
| 982,190 | Shankland | Jan. 17, 1911 |
| 1,085,995 | Petter | Feb. 3, 1914 |
| 1,915,303 | Forsyth | June 27, 1933 |
| 2,013,994 | Schutte | Sept. 10, 1935 |
| 2,025,793 | Tschappat | Dec. 31, 1935 |